United States Patent
Rathod et al.

(10) Patent No.: US 11,954,111 B2
(45) Date of Patent: Apr. 9, 2024

(54) SYSTEM AND METHOD FOR EXECUTING SERVICE REQUEST

(71) Applicant: Innoplexus AG, Eschborn (DE)

(72) Inventors: Ashwinkumar Rathod, Raigad (IN); Souymadeep Ghosh, Kolkata (IN); Rohit Agarwal, Jhansi (IN); Rajat Chaudhary, Saharanpur (IN)

(73) Assignee: INNOPLEXUS AG, Eschborn (DE)

( * ) Notice: Subject to any disclaimer, the term of this patent is extended or adjusted under 35 U.S.C. 154(b) by 301 days.

(21) Appl. No.: 16/369,550

(22) Filed: Mar. 29, 2019

(65) Prior Publication Data
US 2020/0311093 A1    Oct. 1, 2020

(51) Int. Cl.
*G06F 16/25*    (2019.01)
*H04L 67/10*    (2022.01)
*H04L 67/60*    (2022.01)

(52) U.S. Cl.
CPC ............ *G06F 16/254* (2019.01); *H04L 67/10* (2013.01); *H04L 67/60* (2022.05)

(58) Field of Classification Search
CPC ....... G06F 16/254; H04L 67/10; H04L 67/32; H04L 67/20; H04L 67/2823; H04L 67/40
See application file for complete search history.

(56) References Cited

U.S. PATENT DOCUMENTS

| | | | |
|---|---|---|---|
| 2016/0065599 A1* | 3/2016 | Hovor | H04L 67/20 726/23 |
| 2018/0181610 A1* | 6/2018 | Lingamneni | G06F 16/2365 |
| 2018/0373766 A1* | 12/2018 | Crabtree | G06F 16/258 |
| 2019/0171735 A1* | 6/2019 | Miller | G06F 16/2365 |
| 2019/0228171 A1* | 7/2019 | Mathur | G06F 16/242 |

* cited by examiner

*Primary Examiner* — Mark D Featherstone
*Assistant Examiner* — Samuel C Sharpless, III
(74) *Attorney, Agent, or Firm* — Ziegler IP Law Group

(57) ABSTRACT

Disclosed is system for executing service request. The system comprises a processing arrangement and data sources. The processing arrangement receives the service request and is configured to extract data from the data sources based on the service request. The data sources respond in response to a characteristic framework of the service request. The system further comprises an administrator module to permute the service request received by the processing arrangement in accordance with the characteristic framework employed by the data sources. The administrator module is configured to identify at least one attribute of the service request, obtain data corresponding to the at least one attribute of the service request from the data sources, normalize the obtained data and provide the normalized data to execute the service request, via the processing arrangement.

11 Claims, 2 Drawing Sheets

SYSTEM AND METHOD FOR EXECUTING SERVICE REQUEST

TECHNICAL FIELD

The present disclosure relates generally to systems for data extraction; and more specifically, to systems for executing service request by employing an intermediary platform. Moreover, the present disclosure relates to methods for executing service request. Furthermore, the present disclosure also relates to computer program products comprising non-transitory computer-readable storage media having computer-readable instructions stored thereon, the computer-readable instructions being executable by a computerized device comprising processing hardware to execute aforementioned methods.

BACKGROUND

With the advancement in digital technology, exchange of information has facilitated achievement of various functions and services. Typically, networks such as Internet, provides access to a reservoir of information worldwide. Furthermore, such human readable form of information presented by software platforms are extracted from plurality of data repositories. Moreover, such software platforms are developed using sub-routines specifically tailored in accordance with data repositories.

However, with an exponential increase in number of data repositories across the world and disparate construction of the data repositories, the sub-routines for acquiring data has become growingly complex. Typically, quality, reliability and structure of data acquired from the data repositories depend on a source of the data repositories. Moreover, such complex sub-routines for acquiring data from different data repositories stored at different sources has led to a need of standardization thereof. Additionally, such standardization of the sub-routines for acquiring data is to be performed in real-time or near real-time to enable on-demand and prompt application thereof.

Recently, effortless configuration of a variety of computing resources has been aided by cloud-computing models. Typically, cloud-computing models enable convenient and on-demand access to the computing resources (such as networks, servers, web-platforms, services, and so forth). Furthermore, Infrastructure-as-a-service (IaaS) cloud-computing model provides high-level subroutines for on-demand access and configuration of network infrastructure (such as physical computing resources, location, data partitioning, scaling, security, and so forth), while Platform-as-a-service (PaaS) cloud-computing model provides subroutines for on-demand development, execution, and management of web-platforms. Moreover, such cloud-computing models are configured using minimal effort, and human interaction.

However, such cloud computing models for on-demand access and configuration of data, stored in various data repositories, has not been successfully implemented owing to non-similar and dynamic source of the data repositories. Furthermore, for accessing (namely, querying) the data repositories specialized query language (such as SQL, NoSQL, and so forth) is required, wherein the query language is specific to the data repository to be accessed. Consequently, acquiring developing sub-routines tailored to changing needs and demands becomes challenging and time-consuming. Moreover, developing such sub-routines require enormous human intervention. Additionally, the data repositories are not distributed in nature, owing to non-scalability thereof. Consequently, lack of distribution of the data repositories hampers elasticity and availability of the data repositories, thereby making them incompatible to cloud computing model (namely, Data-as-a-service (DaaS) model) for on-demand configuration of data. Furthermore, processing rapidly ingested large amounts of data from various data repositories becomes challenging, owing to stateful nature of the data.

Therefore, in light of the foregoing discussion, there exists a need to overcome the aforementioned drawbacks associated with the conventional system for acquiring data from various data repositories.

SUMMARY

The present disclosure seeks to provide a system for executing a service request. The present disclosure also seeks to provide a method for executing a service request. The present disclosure seeks to provide a solution to the existing problem of incompetence of scalable operation of systems executing the service request. An aim of the present disclosure is to provide a solution that overcomes at least partially the problems encountered in prior art, and provides a scalable and concurrent architecture for systems executing the service request.

In one aspect, an embodiment of the present disclosure provides a system for executing a service request, wherein the system comprises a processing arrangement communicably coupled, via one or more data communication networks, to a plurality of data sources, wherein the processing arrangement receives the service request and is configured to extract data from the plurality of data sources based on the service request,
wherein the plurality of data sources respond in response to a characteristic framework of the service request,
wherein the system further comprises an administrator module to permute the service request received by the processing arrangement in accordance with the characteristic framework employed by the plurality of data sources, wherein the administrator module is configured to:
  identify at least one attribute of the service request;
  obtain data corresponding to the at least one attribute of the service request from the plurality of data sources;
  normalize the obtained data; and
  provide the normalized data to execute the service request, via the processing arrangement.

In another aspect, an embodiment of the present disclosure provides a method for executing a service request, wherein the method is implemented via a system comprising a processing arrangement communicably coupled, via one or more data communication networks, to a plurality of data sources, wherein the processing arrangement receives the service request and is configured to extract data from the plurality of data sources based on the service request,
wherein the plurality of data sources respond in accordance with a format of the service request,
wherein the system further comprises an administrator module to permute the service request received by the processing arrangement in accordance with the format employed by the plurality of data sources, the method comprising:
  identifying at least one attribute of the service request;
  obtaining data corresponding to the at least one attribute of the service request from the plurality of data sources;
  normalizing the obtained data; and
  providing the normalized data to execute the service request, via the processing arrangement.

In yet another aspect, an embodiment of the present disclosure provides a computer program product comprising non-transitory computer-readable storage media having computer-readable instructions stored thereon, the computer-readable instructions being executable by a computerized device comprising processing hardware to execute an aforesaid method.

Embodiments of the present disclosure substantially eliminate or at least partially address the aforementioned problems in the prior art, and enables derivation of comprehensive and intelligible data for executing the service request without increasing computational efforts of the system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
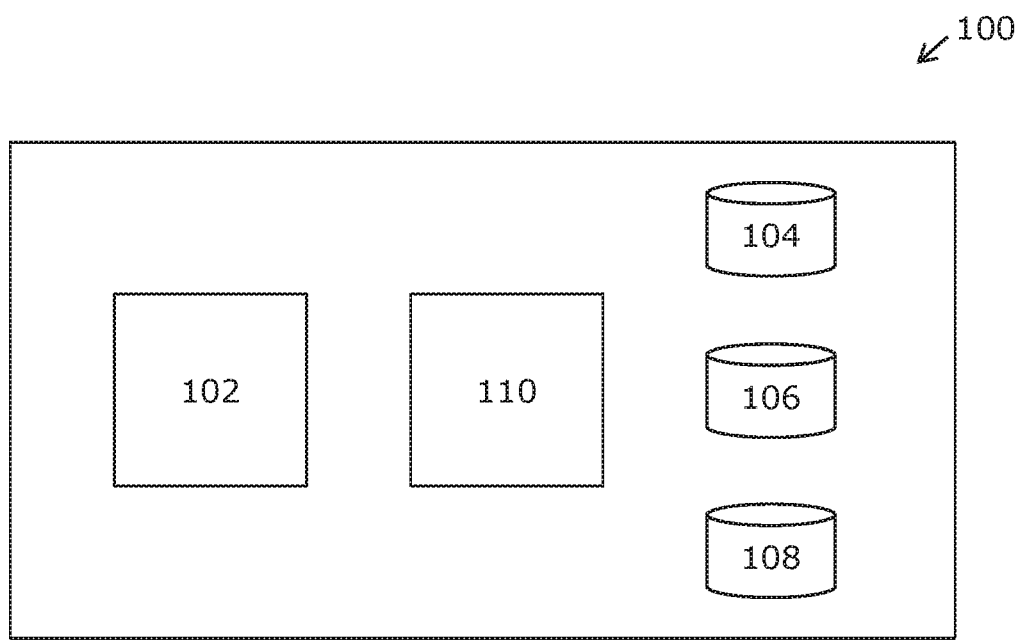
FIG. 1 is a schematic illustration of a system for executing a service request, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for executing a service request, wherein the system comprises a processing arrangement communicably coupled, via one or more data communication networks, to a plurality of data sources, wherein the processing arrangement receives the service request and is configured to extract data from the plurality of data sources based on the service request, wherein the plurality of data sources respond in response to a characteristic framework of the service request, wherein the system further comprises an administrator module to permute the service request received by the processing arrangement in accordance with the characteristic framework employed by the plurality of data sources, wherein the administrator module is configured to:
  identify at least one attribute of the service request;
  obtain data corresponding to the at least one attribute of the service request from the plurality of data sources;
  normalize the obtained data; and
  provide the normalized data to execute the service request, via the processing arrangement.

In another aspect, an embodiment of the present disclosure provides a method for executing a service request, wherein the method is implemented via a system comprising a processing arrangement communicably coupled, via one or more data communication networks, to a plurality of data sources, wherein the processing arrangement receives the service request and is configured to extract data from the plurality of data sources based on the service request, wherein the plurality of data sources respond in accordance with a format of the service request, wherein the system further comprises an administrator module to permute the service request received by the processing arrangement in accordance with the format employed by the plurality of data sources, the method comprising:
  identifying at least one attribute of the service request;
  obtaining data corresponding to the at least one attribute of the service request from the plurality of data sources;
  normalizing the obtained data; and
  providing the normalized data to execute the service request, via the processing arrangement.

The aforesaid system for executing a service request provides a platform that processes the service request to derive outcome therefor. Specifically, the system described herein operates as an intermediary platform that identifies the at least one attribute of the service request and further converts for example, a general-purpose service request, into a service request having characteristic framework employed by the plurality of data sources. Beneficially, such alteration of the service request enables sub-routines of the processing arrangement to extract data from each of the plurality of data sources having characteristic framework associated therewith, without being altered explicitly for each of the plurality of data sources. Subsequently, such an intermediary platform enhances elasticity, availability, and scalability of the sub-routines for extraction of data from the plurality of data sources. Moreover, the system enables extraction of data in real-time and further processing thereof to obtain normalized data that adhere to architectural constraints, using the intermediary platform. Moreover, the system aims to achieve concurrency in the sub-routines thereby allowing processing of large number of service requests without scaling of the system. Additionally, the system provides the data to execute the service request upon normalization thereof, thereby enabling wide applicability thereof. The system thus substantially decreases human intervention required for extracting data from the plurality of data sources and further providing the extracted data in intelligible form.

Beneficially, the system described herein does not merely circumvent problem associated with cloud computing platforms that offer Data-as-a-Service (DaaS) but provides a platform that addresses a crucial technical problem associated with data sources having non-similar and dynamic nature. It will be appreciated that the system for executing a service request proffers a platform to achieve a technical effect of enabling extraction of data from the plurality of data sources and processing thereof to obtain a normalized form. Moreover, the aforesaid system addresses real life hinderance associated with devices used for operating web-platforms that obtain data from a plurality of data sources for operation thereof. Typically, such devices fail to acquire intelligible information in real-time from third-party hosts (namely, data sources), owing to varying characteristic framework for accessing thereto. Subsequently, the system described herein aims to provide a solution for uninterrupted operation of such web-platforms operating on the principles of Data-as-a-Service. The system provides a platform for solving the aforesaid problem as opposed to merely circumventing the problem. Additionally, the system enhances operational characteristics of a computer or a computing device wherein the system is implemented, such as a mobile device by optimizing performance of a web-platform installed therein. Specifically, the performance of the computer or the computing device is optimized owing to substantial decrease in complexity and run-time of sub-routines of the web-platform. Beneficially, the system allows the web-platform to handle influx of demand pertaining to service requests, increase productivity of the web-platform, and meet changing needs in accordance with the service requests.

It will be appreciated that the aforesaid system and the aforesaid method are not limited to execute a single service request. Alternatively, the system and method are employed to execute a plurality of service request. Moreover, in an instance, the plurality of service requests are executed at same time. Furthermore, the system is employed to perform execution of service requests obtained from various locations. The service requests may be obtained from one or more locations provided by one or more users, wherein the one or more users are a person or a bot that operates the aforesaid system.

The system described herein, refers to a collection of one or more programmable and non-programmable components that are configured to execute the service request. In an example, the system may be a framework that is operable to perform end-to-end automation of data extraction, normalization and error logging for the data. Throughout the present disclosure, the term "data" refers to information obtained from any source that can be processed and stored on a computer readable media. In an example, the data can be information including text in an electronic document related to a specific domain such as pharmaceuticals. In another example, the data can be sensory information acquired from an operational device having sensors. Optionally, data includes attributes, characteristics, properties, numbers, quantities and the like of a specific domain and/or environment. In an example, the data refers to a set of web APIs that is consumed based on demand.

Furthermore, the system comprises a processing arrangement communicably coupled, via one or more data communication networks, to a plurality of data sources. Throughout the present disclosure, the term "processing arrangement" refers to a computational element that is operable to respond to and processes instructions that drive the system for executing service request. Optionally, the processing arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term 'processing arrangement' refers to one or more individual processors, processing devices and various elements associated with a processing device that may be shared by other processing devices. Additionally, the one or more individual processors, processing devices and elements are arranged in various architectures for responding to and processing the instructions that drive the system.

Furthermore, the processing arrangement is communicably coupled to the plurality of data sources, via the one or more data communication networks. Throughout the present disclosure, the term "data communication network" refers to an arrangement of interconnected programmable and/or non-programmable components that are configured to facilitate data communication between one or more electronic devices and/or databases, whether available or known at the time of filing or as later developed. Furthermore, the data communication network includes, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the data communication network includes wired or wireless communication that can be carried out via any number of known protocols, including, but not limited to, Internet Protocol (IP), Wireless Access Protocol (WAP), Frame Relay, or Asynchronous Transfer Mode (ATM). In an example, the system employs Hyper Text Transfer Protocol (HTTP) for external communications over the data communication network and Remote Procedure Call (RPC) such as goggle Remote Procedure Call (gRPC) for internal communications over the data communication network.

Throughout the present disclosure, the term "plurality of data sources" refers to repositories where the data is stored in digital form that can be used for further computational process. Optionally, the data source stores data in at least one of plurality of formats. Examples of the plurality of formats include, but are not limited to, textual data, audio data, visual data (namely, image, video, and so forth), spreadsheets, graphs, and scripts. In an example, the data source is a hypertext document connected to World Wide Web.

Optionally, the data source can be implemented using as at least one database. Throughout the invention, the term 'database' as used herein refers to an organized body of digital information regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form. The data source implemented as the database includes any data storage software and systems, such as, for example, a relational database like IBM DB2 and Oracle 9. In an example, the data source may be a database comprising a plurality of patent documents pertaining to a specific domain such as pharmaceuticals.

Optionally, the database relating to the plurality of data source is implemented as a document database or wide column database (for example MongoDB, HBase and so forth) for data persistence and analytics. Additionally, optionally, the database relating to the plurality of data source is implemented as a search engine database (for example ElasticSearch and so forth) for instant information retrieval based on the service request. Moreover, in an example, the database relating to the plurality of data source is implemented as a graph database (for example Neo4J, ArangoDB and so forth) to exploit concept relationships and empower discovery based on the service request.

Optionally, the data source can be implemented as a structured data wherein the data resides in an organized form. In such case, the data source may be a spreadsheet that stores structured data related to sensory information acquired from medical devices attached to one or more patients. In another example, the data stored in the data source may be unstructured. In such case, the data source may comprise documents that does not have a pre-defined model and/or is not organized in a pre-defined manner (for example, in a row and column manner).

Optionally, the system comprises at least one database arrangement. In such case, the at least one data base arrangement operates as a data source. For example, the data source can be a database within the system that stores relevant data in a digital form for further computational process. It will be appreciated that the relevant data refers to pertinent data stored on the data source in digital form. Optionally, the data source can be implemented as a local database within the system. Optionally, the data source can be implemented as a third-party database, wherein the system fetches relevant data from the third-party database. The third-party database refers to one or more systems, applications, and/or a combination thereof for providing electronic content (namely, data) to the system via a data communication network. Furthermore, optionally, the third-party database is subscription based, i.e. the data is provided as an online service that is accessed by the system with subscriber accounts.

Moreover, optionally, the system acquires raw data from the plurality of data sources. Typically, the 'raw data' from the plurality of sources refers to structured or unstructured data stored in the plurality of data sources. Optionally, such raw data does not have defined labels associated thereto. More optionally, the raw data may not be processed for use thereof.

Furthermore, optionally, the system normalizes the raw data based on at least one data attribute. In such case, the raw data acquired from the plurality of data sources is processed for utilization thereof. Specifically, the raw data is processed (namely, normalized) to obtain relevant information therefrom. In an example, the raw data is normalized by employing selective extraction of useful data from the raw data, organization of the useful data in a pre-defined manner, analysis of the useful data and further formatting of the analyzed data in a pre-defined model.

Optionally, the system normalizes the raw data based on the at least one data attribute. The term "at least one data attribute" as used herein, refers to a characteristic feature of data. Specifically, the at least one attribute for a given raw data acquired from a given data source distinguishes the given raw data from raw data acquired from plurality of data sources. Examples of the at least one data attribute for the given raw data include, but are not limited to, location of the given data source of the given raw data, a type (such as textual, audio, visual, and so forth) of the given raw data, a label (such as a domain or a field) relating to the given raw data, a size of the given raw data, a format (such as color, font, design, and so forth) of the given raw data, and language of the given raw data. Notably, the system utilizes the at least one data attribute relating to the given raw data for normalization thereof. It will be appreciated that upon normalization of the raw data, relevant information is extracted therefrom. Optionally, the normalized data is organized and structured for utilization thereof.

Furthermore, optionally, the system stores the normalized data in the at least one database arrangement. Specifically, the normalized data comprising relevant information is stored in the at least one database arrangement of the system, wherein the at least one database arrangement of the system operates as the data source for execution of the service request. Subsequently, data stored in the at least one database arrangement is set of indexed, organized and semantically associated information generated by normalizing the raw data acquired form the plurality of data sources. Beneficially, the normalized data stored in the at least one database enhances accessibility of data. Consequently, the system does not need to refer the plurality of data sources for further processing and analysis of data to execute every service request.

Throughout the present disclosure, the term "service request" refers to a data structure that characterizes information entered (provided) to a computer program, such as a search engine or a web crawler as an input to extract relevant information from an information source, such as the plurality of data sources or the Internet. In an example, the data structure may be any one of or a combination of: one or more keywords, terms, words, phrases syntax, symbols, numbers, and the like. The service request refers to a request for information from at least one of the plurality of data sources. It will be appreciated that the service request for obtaining information form the plurality of data sources is provided by a user to the processing arrangement. In an example, the user providing the service request is a human querying the plurality of data sources. In another example, the user providing the service request is a bot querying the plurality of data sources. In yet another example, the user providing the service request in a software program implemented by way of a plurality of sub-routines, wherein the software program enables operation of a web-platform wherein it is implemented.

Optionally, the service request is implemented using a defined language. Specifically, the service request received has a query language associated thereto, so as to perform a range of simple to complex extraction of data from the databases relating to the plurality of data sources for execution thereof. In an example, the service request is implemented by way of a structured query language (for example, SQL, and so forth). In such case, the service request implemented by way of structured query language extracts information from structured and organized databases such as relational databases, relating to the plurality of data sources. In another example, the service request is implemented by way of an unstructured query language (for example, UnQL, NoSQL, and so forth).

Optionally, the system authenticates the service request received by the processing arrangement. Specifically, authenticating the service request validates an authenticity of the user providing the service request. More specifically, the authentication of the service request enables authentication of an identity of the user. Beneficially, authentication of the identity of the user providing the service request prevents any malicious behavior that may compromise with security of data stored in the databases relating to the plurality of data sources and/or the at least one database arrangement of the system. Furthermore, authentication of the identity of the user enables identification of the user, thereby enabling the system to provide stateful data pertaining to a history of the user. Beneficially, providing stateful data to the user of the system enables development of web platforms over a Hyper Text Transfer Protocol (HTTP) network that are inherently stateless in nature.

Furthermore, the processing arrangement receives the service request and is configured to extract data from the plurality of data sources based on the service request. Specifically, the system extracts data form the database relating to the plurality of data sources. It will be appreciated that such extracted data is based on the service request, wherein the data is extracted in response to, for example, domain and context of the service request. Furthermore, the system for executing the service request employs the data communication network to receive data from the database relating to the plurality of data sources. Alternatively, the data is retrieved from the at least one database arrangement of the system, based on the service request.

The plurality of data sources responds in response to the characteristic framework of the service request. It will be appreciated that a specific framework (namely, characteristic framework) of sub-routine is required for extraction of data from a data source, based on the data source. Moreover, a type of data extracted from the data source is based on the characteristic framework of the service request employed for extraction of data. Subsequently, each of the plurality of data sources respond in accordance with a sub-routine of the service request, wherein the sub-routine is implemented by way of an algorithm or a combination of one or more algorithms. In an example, database associated with a data source is implemented by way of a relational database. In such case, a sub-routine for the service request is implemented by way of a Structured Query Language (SQL) for extraction of data therefrom. Subsequently, the data source returns data in form of elements represented in rows and columns. In another example, the database associated with a data source is implemented by way of an unstructured database. In such case, a sub-routine for the service request is implemented so as to represent data to be extracted in form of a graph for data mining activities.

The system further comprises the administrator module to permute the service request received by the processing arrangement in accordance with the characteristic framework employed by the plurality of data sources. Throughout the present disclosure, the term "administrator module" refers to a programmable module configured to permute the service request for extraction of data accordingly, for execution of the service request. Additionally, the administrator module is implemented by way of hardware, software, firmware and/or any combination thereof. Specifically, the administrator module modifies the service request based on a characteristic framework required for extraction of data from a given data source in the plurality of data sources. It will be appreciated that the service request is modified based on characteristic framework required by each of the plurality of data sources, for execution of the service request. Moreover, the service request is further permuted in accordance with a characteristic framework required by the at least one database arrangement of the system, for extraction of data therefrom.

The administrator module is configured to identify at least one attribute of the service request. Specifically, the administrator module processes the service request received by the processing arrangement to identify the at least one attribute. It will be appreciated that the term "at least one attribute of the service request" refers to a characteristic feature of the service request. Specifically, the at least one attribute of the service request enables identification of a type of data demanded on the basis of the service request. Subsequently, the at least one attribute of the service request distinguishes operations for execution of the service request from operations for execution of another service request.

Optionally, the at least one attribute of the service request includes at least one of: a name, a unique identification, a distinguishing feature. More optionally, the name of the at least one attribute defines at least one of: a domain of the service request, a classification of the service request in the domain, a field of the service request, a subject of the service request. Moreover, the unique identification of the service request refers to a set of character that uniquely identify, for example, the domain of the service request, set of data sources relating to the domain of the service request, and so forth. Furthermore, the distinguishing feature refers to a specific characteristic relating to the service request, based on which the data is to be acquired.

In an example, the service request is 'side-effects of a drug morphine'. In such case, the at least one attribute of the service request includes, for example, a name associated with a domain of the service request 'biomedical', a unique identification associated with a set of data sources relating to the service request 'BMP100023' and a distinguishing feature relating to the service request 'side-effects' and 'morphine'.

The administrator module is configured to obtain data corresponding to the at least one attribute of the service request from the plurality of data sources. It will be appreciated that data sources storing data related to the service request are exclusively queried owing to attributes of the service request. Optionally, the at least one database arrangement of the system is also queried based on the at least one attribute of the service request. Moreover, optionally, the data acquired by the administrator module may be structured, unstructured, or a combination thereof. Optionally, the administrator module acquires data as documents having a plurality of formats. In such case, the plurality of formats (for example, textual, audio, visual, graphical, and so forth) of the documents is based on a format of data stored therein. In another instance, the administrator module obtains data is JSON format.

The administrator module is configured to normalize the obtained data. Typically, the term "normalize" refers to processing of data for standardization thereof. Specifically, the obtained data is, for example, re-organized for normalization thereof. Pursuant to embodiments of the present disclosure, the administrator module normalizes the acquired data to remove inconsistencies in the acquired data (for example, redundancy, duplication, varying range, varying format, logical dependencies, and so forth). In an example, the administrator module normalizes the acquired data to make the obtained data compliant for operations of a web platforms that follows architectural style relating to Representational State Transfer software (namely, RESTful web-platforms). It will be appreciated that the such data for has a defined set of constraints associated thereto.

Optionally, the normalized data has a defined architectural style. Typically, the term 'architectural style' refers to characterized features that defines the constraints of data. Optionally, the architectural style defines a manner in which the acquired data is to be represented or organized for normalization thereof. Specifically, the obtained data is normalized to comply with the defined architectural style to enable integrity and coherence between the obtained data. In an example, the architectural style of the obtained data is defined with regard to web-platforms developed using Representational State Transfer software.

The administrator module is configured to provide the normalized data to execute the service request, via the processing arrangement. Specifically, the normalized data is provided to execute the service request such that insightful information may be derived from further processing thereof. Beneficially, the normalized data facilitates derivation of insightful information as it reduces computational complexity and effort therefor. In an example, the normalized data comprises real-time market information and customer data. Moreover, such normalized data is provided by the administrator module regardless of geographical and demographical differences.

Beneficially, the system provides the normalized data to execute the service request such that the normalized data offers in-depth and authentic information based on insights from the plurality of data sources and/or the at least one database arrangement of the system. Subsequently, the normalized data provides greater support in decision making relating from the normalized data provided. Furthermore, the system facilitates successful maintenance of data accuracy thereby providing relevant and intelligible data. Subsequently, the system evades the need to rely on third-party data resellers who provide obsolete data humongous prices.

It will be appreciated that the system is employs one or more computing language (namely, programming language) for development and/or operation thereof. Examples of the programming language employed by the system include, but are not limited to, Java Script, Java, Python, Bash, ANTLR4, C, C++, Ruby, and PHP.

In an exemplary implementation of the system as described herein, the system provides a platform that proffers data of ° Life Sciences' domain. In such case, the processing arrangement serves as a platform providing Data-as-a-Service relating to the 'Life Sciences' domain and processing arrangement is facilitated by the administrator module for enhancing performance efficiency thereof. Optionally, the system is implemented by way of a plurality of Application Programming Interfaces (APIs) for execution of a service request over a Hyper Text Transfer Protocol (HTTP) network. It will be appreciated that the APIs refer to set of functions and procedures allowing creation of applications (namely, web platforms) that consumes data provided by the system. In such case, the plurality of APIs comprise a first interface for authorization of the service request received. Moreover, the system includes an administration module implemented by way of a second interface that is operable to route (namely, connect) the service request to correct service functions, wherein the service functions are operable to run sub-routines that accesses data sources for execution of the service request. Typically, the second interface of the administration module identifies the at least one attribute of the service request for routing thereof to the correct service functions. Furthermore, the administrator module acquires data form the plurality of the data sources and/or the at least one database arrangement of the system. Optionally, the APIs of the system are secure using at least one api-key. In an example, the administrator module acquires the data by performing a querying process on a search engine, for example, ElasticSearch. Moreover, the administrator module acquires the data by performing a querying process on a plurality of databases such as MySQL database, MongoDB database, ArangoDB database, ElasticSearch database, Redis database, and so forth. Subsequently, it will be appreciated that the service request received by the processing arrangement of the system is to be converted. In such case, the service request is converted to a service request having characteristic framework that facilitates querying of the search engine and the databases. Furthermore, the administrator module routes the service request to the service functions for acquiring data from the plurality of data sources and the at least one database arrangement. In an example, service requests are converted to perform service functions for acquiring data from databases defining ontology (namely, concepts, synonyms, and so forth relating to the service request), databases defining relationships related to the service requests, databases defining functions, and databases defining Key Opinion Leader (KOL) relating to the service request. Additionally, the second interface operates to normalize the data acquired from the plurality of data sources and/or the at least one database arrangement. In an example, the administrator module makes the acquired data RESTful for further processing thereof.

It will be appreciated that cloud-computing models facilitating Data-as-a-Service have numerous benefits, owing to rapid increase in demand of large volumes of data. Therefore, the system providing Data-as-a-Service provides flexibility of moving data to the web-platform providing service request for data. Moreover, the system facilitates reduction in cost on data maintenance for such web-platforms and broad accessibility of the data. Additionally, normalized data is provided to the web-platforms providing service requests for extraction of information from a Data-as-a-Service platform (namely, the system) thereby enhancing performance of the web-platforms in terms of integrity, speed and security.

Beneficially, the system operates to permute the service request for acquiring data from the plurality of data sources. In this regard, the system enables platforms providing Data-as-a-Service to be highly scalable and to meet growing demand of users. Moreover, the system optimizes performance of such platforms providing Data-as-a-Service in terms of run-time efficiency by normalizing the data for processing thereof. Subsequently, the system aims to efficiently enhance concurrency of the platforms providing Data-as-a-Service by processing a plurality of service requests from a plurality of users at a given time, owing to optimized performance of the system. Moreover, the system enhances accessibility and utility of the platforms providing Data-as-a-Service by automating operations for execution of the service request on the platforms providing Data-as-a-Service. Furthermore, the system enables querying of exponentially increasing databases relating to plurality of data sources and/or at least one database arrangement without any scaling of computational infrastructure or alterations of sub-routines of web-platforms that access data by providing the service request to the processing arrangement.

Moreover, the present description also relates to the method as described above. The various embodiments and variants disclosed above apply mutatis mutandis to the method.

Optionally, the method further comprises:
acquiring raw data from the plurality of data sources;
normalizing the raw data based on at least one data attribute; and
storing the normalized data in at least one database arrangement Optionally, the normalized data has a defined architectural style.

Optionally, the service request is implemented using a defined language.

Optionally, the method includes authenticating the service request received by the processing arrangement.

Optionally, the at least one attribute of the service request includes at least one of: a name, a unique identification, a distinguishing feature.

In yet another aspect, an embodiment of the present disclosure relates to a computer program product comprising non-transitory computer-readable storage media having computer-readable instructions stored thereon, the computer-readable instructions being executable by a computerized device comprising processing hardware to execute a method for executing the service request.

DETAILED DESCRIPTION OF THE DRAWINGS

Referring to FIG. 1, there is shown a schematic illustration of a system 100 for executing a service request, in accordance with an embodiment of the present disclosure. The system 100 comprises a processing arrangement 102 communicably coupled, via one or more data communication networks, to a plurality of data sources (depicted as data sources 104, 106, and 108). The processing arrangement 102 receives the service request and is configured to extract data from the plurality of data sources (namely, the data sources 104, 106, and 108) based on the service request. Notably, the plurality of data sources (namely, the data sources 104, 106, and 108) responds in response to a characteristic framework of the service request. The system 100 further comprises an administrator module 110 to permute the service request received by the processing arrangement 102 in accordance with the characteristic framework employed by the plurality of data sources (namely, the data sources 104, 106, and 108). Furthermore, the administrator module 110 is configured to identify at least one attribute of the service request. The administrator module 110 obtains data corresponding to the at least one attribute of the service request from the plurality of data sources (namely, the data sources 104, 106, and 108), normalizes the obtained data, and provides the normalized data to execute the service request, via the processing arrangement 102.

FIG. 1 is merely an example, which should not unduly limit the scope of the claims herein. It is to be understood that the simplified illustration of the system 100 for executing a service request is provided as an example and is not to be construed as limiting the system 100 to specific numbers, types, or arrangements of the processing arrangement. A person skilled in the art will recognize many variations, alternatives, and modifications of embodiments of the present disclosure.

Figure 2:
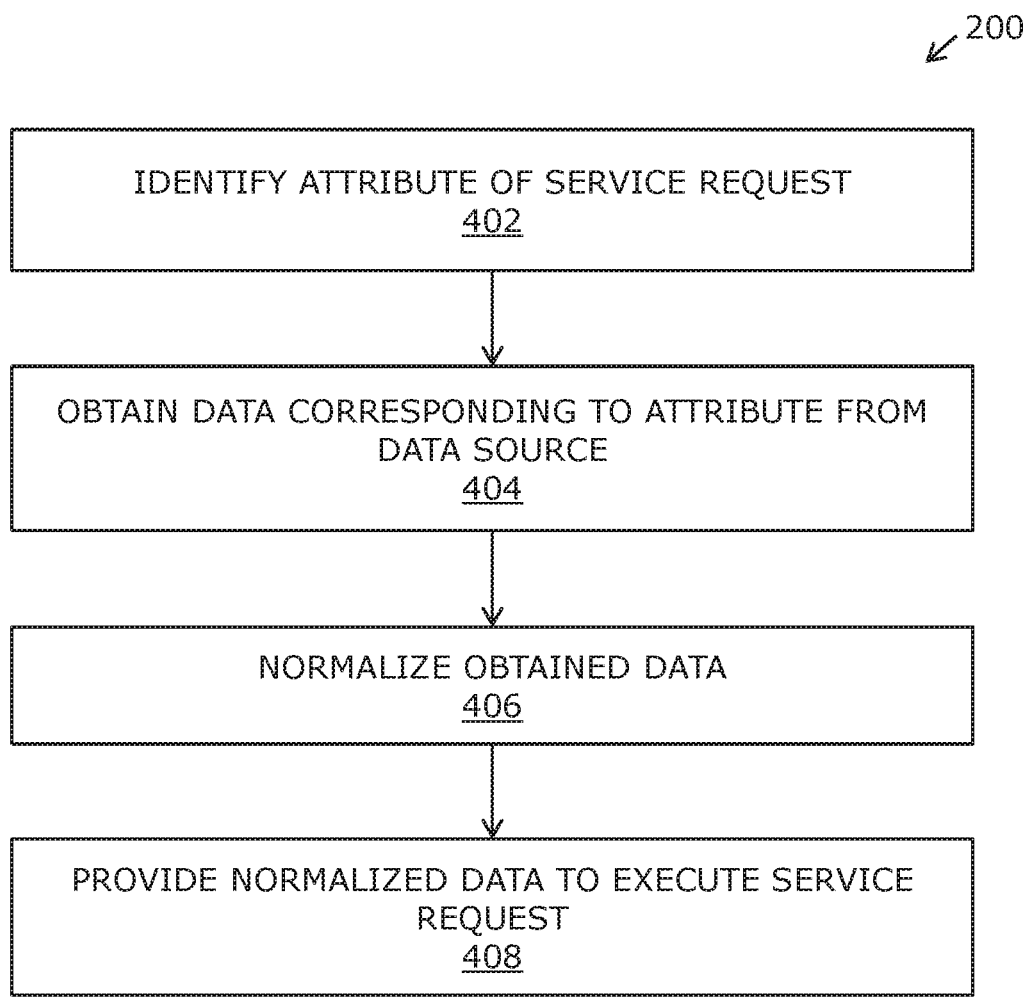
FIG. 2 is a flow chart depicting steps of a method for executing a service request, in accordance with an embodiment of the present disclosure.

Referring to FIG. 2, there is shown a flow chart depicting steps of a method for executing a service request, in accordance with an embodiment of the present disclosure. The method is depicted as a collection of steps in a logical flow diagram, which represents a sequence of steps that can be implemented in hardware, software, or a combination thereof, for example as aforementioned.

The method for executing a service request is implemented via a system comprising a processing arrangement communicably coupled, via one or more data communication networks, to a plurality of data sources. The processing arrangement receives the service request and is configured to extract data from the plurality of data sources based on the service request. Furthermore, the plurality of data sources responds in accordance with a format of the service request. The system further comprises an administrator module to permute the service request received by the processing arrangement in accordance with the format employed by the plurality of data sources.

At a step 202, at least one attribute of the service request is identified. At a step 204, data corresponding to the at least one attribute of the service request is obtained from the plurality of data sources. At a step 206, the obtained data is normalized. At a step 208, the normalized data is provided via the processing arrangement to execute the service request.

The steps 202, 204, 206 and 208 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

We claim:

1. A system for executing a service request, wherein the system comprises:
 a processing arrangement communicably coupled, via one or more data communication networks, to a plurality of data sources, wherein the processing arrangement receives the service request and is configured to extract data from the plurality of data sources based on the service request,
 wherein the service request is made by a user, as input to a search engine or a web crawler to extract data from the plurality of data sources;
 authenticating the user to ensure permitted access to the plurality of data sources;
 enabling identification of the user to provide stateful data pertaining to a history of the user and wherein a login by the user initiates the authenticating of the user and a logoff by the user initiates a recording of the stateful data and wherein a subsequent login by the user retrieves the recording of the stateful data;
 an administrator module to permute the service request received by the processing arrangement, wherein the administrator module is configured to:
  identify at least one attribute of the service request;
  convert the service request into another service request, wherein the another service request includes a characteristic framework employed by the plurality of data sources,
  wherein the plurality of data sources responds in response to the characteristic framework of the another service request, wherein the characteristic framework of a sub-routine of the another service request is employed for the extraction of the data from the plurality of data sources, based on the plurality of data sources, wherein each of the plurality of data sources responds in accordance with the sub-routine of the another service request, and wherein the sub-routine of the another service request is implemented using one or more algorithms,
  obtain data corresponding to the at least one attribute of the service request from the plurality of data sources, wherein a type of the data obtained from the plurality of data sources is based on the characteristics framework of the another service request employed for extraction of the data;
  normalize the obtained data, wherein normalization is employed to remove inconsistencies comprising one or more of redundancy, duplication, varying range, varying format, and logical dependencies in the data; and provide the normalized data to execute the service request, via the processing arrangement;

wherein the at least one attribute of the service request includes at least one of: a name, a unique identification, a distinguishing feature, wherein the name includes at least one of: a domain of the service request, a classification of the service request in the domain, a field of the service request, a subject of the service request; wherein the unique identification includes a set of character that uniquely identify: the domain of the service request, set of data sources relating to the domain of the service request, and wherein the distinguishing feature includes a specific characteristic relating to the service request based on which the data is to be acquired.

2. The system of claim 1, wherein the system further comprises at least one database arrangement, wherein the system is configured to:
acquire raw data from the plurality of data sources;
normalize the raw data based on at least one data attribute; and store the normalized data in the at least one database arrangement.

3. The system of claim 1, wherein the normalized data has a defined architectural style.

4. The system of claim 1, wherein the service request is implemented using a defined language.

5. The system of claim 1, wherein the system authenticates the service request received by the processing arrangement.

6. A method for executing a service request, wherein the method is implemented via a system comprising a processing arrangement communicably coupled, via one or more data communication networks, to a plurality of data sources, wherein the processing arrangement receives the service request and is configured to extract data from the plurality of data sources based on the service request, wherein the service request is made by a user, as input to a search engine or a web crawler to extract data from the plurality of data sources;

authenticating the user to ensure permitted access to the plurality of data sources;

enabling identification of the user to provide stateful data pertaining to a history of the user and wherein a login by the user initiates the authenticating of the user and a logoff by the user initiates a recording of the stateful data and wherein a subsequent login by the user retrieves the recording of the stateful data;

wherein the method is further implemented via the system further comprising an administrator module to permute the service request received by the processing arrangement, the method comprising:

identifying at least one attribute of the service request;
converting the service request into another service request, wherein the another service request includes a characteristic framework employed by the plurality of data sources, wherein the plurality of data sources responds in response to the characteristic framework of the another service request, wherein the characteristic framework of a sub-routine of the another service request is employed for the extraction of the data from the plurality of data sources, based on the plurality of data sources, wherein each of the plurality of data sources responds in accordance with the sub-routine of the another service request, and wherein the sub-routine of the another service request is implemented using one or more algorithms, obtaining data corresponding to the at least one attribute of the service request from the plurality of data sources, wherein a type of the data obtained from the plurality of data sources is based on the characteristics framework of the another service request employed for extraction of the data;

normalizing the obtained data, wherein normalization is employed to remove inconsistencies comprising one or more of redundancy, duplication, varying range, varying format, and logical dependencies in the data; and providing the normalized data to execute the service request, via the processing arrangement;

wherein the at least one attribute of the service request includes at least one of: a name, a unique identification, a distinguishing feature, wherein the name includes at least one of: a domain of the service request, a classification of the service request in the domain, a field of the service request, a subject of the service request, wherein the unique identification includes a set of character that uniquely identify: the domain of the service request, set of data sources relating to the domain of the service request, and wherein the distinguishing feature includes a specific characteristic relating to the service request based on which the data is to be acquired.

7. The method of claim 6, wherein the method further comprises: acquiring raw data from the plurality of data sources;

normalizing the raw data based on at least one data attribute; and storing the normalized data in at least one database arrangement.

8. The method of claim 6, wherein the normalized data has a defined architectural style.

9. The method of claim 6, wherein the service request is implemented using a defined language.

10. The method of claim 6, wherein the method includes authenticating the service request received by the processing arrangement.

11. A computer program product comprising non-transitory computer-readable storage media having computer-readable instructions stored thereon, the computer-readable instructions being executable by a computerized device comprising processing hardware to execute the method of claim 6.

* * * * *